Figure 1:
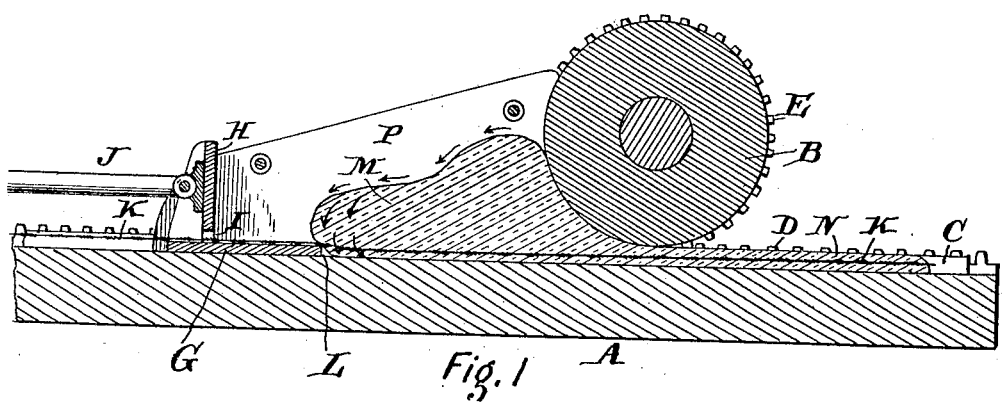

No. 876,307.

PATENTED JAN. 7, 1908.

F. SHUMAN.
MACHINE FOR THE MANUFACTURE OF WIRE GLASS.
APPLICATION FILED MAY 23, 1906.

Attest
A. M. Kelly
M. K. Bates

Inventor
Frank Shuman
By his atty

UNITED STATES PATENT OFFICE.

FRANK SHUMAN, OF PHILADELPHIA, PENNSYLVANIA, ASSIGNOR TO THE CONTINUOUS GLASS PRESS COMPANY, OF PHILADELPHIA, PENNSYLVANIA, A CORPORATION OF NEW JERSEY.

MACHINE FOR THE MANUFACTURE OF WIRE-GLASS.

No. 876,307.     Specification of Letters Patent.     Patented Jan. 7, 1908.

Original application filed June 14, 1902, Serial No. 111,748. Divided and this application filed May 23, 1906. Serial No. 318,280.

*To all whom it may concern:*

Be it known that I, FRANK SHUMAN, a resident of the city and county of Philadelphia and State of Pennsylvania, have invented an Improvement in Machines for the Manufacture of Wire-Glass, of which the following is a specification.

My invention has reference to machines for the manufacture of wire glass and consists of certain improvements which are fully set forth in the following specification and shown in the accompanying drawings which form a part thereof.

The application is a division of my application Ser. No. 111,748 filed June 14th, 1902.

The object of my invention is to provide a suitable apparatus which shall positively cause the meshed wire to be fed into the molten glass in such manner that the glass shall properly envelop it with the result of its being definitely located between the two surfaces so as to make a perfect article, namely, one in which the meshed wire is all covered and uniformly positioned within the glass sheet.

More specifically, my improved machine embodies a roller rolling a mass of glass upon a table, combined with means for introducing a meshed wire layer under the forward part of the ball of glass and supporting it temporarily in an advancing manner clear of the table, but unobstructed from below, whereby the molten glass is caused to flow by gravity through the meshes and below the wire prior to being rolled.

My invention consists further in so combining the meshed wire guide with the roller and gun that the point of support of the meshed wire may be advanced more slowly than the advance of the roller and gun to compensate for the gradual consumption of the glass and its less extension in advance of the point of rolling pressure.

As a suitable means for carrying out my invention, I provide a smooth table and roller for rolling the glass into a sheet and combine therewith an adjustable guide resting upon the surface of the table and over which the meshed wire layer is guided, the said guide being advanced commensurately with the speed of the advancing mass of molten glass. The meshed wire layer is thus supported by the guide slightly above the surface of the table so as to permit the molten glass to freely flow through the meshes to the under side and thus sustain the meshed wire layer clear of the surface of the table during the rolling operation. In this manner the meshed wire layer is incorporated into the glass sheet and may be located substantially equi-distant from each surface, thereby producing a more perfect article than has heretofore been customary.

Figure 2:
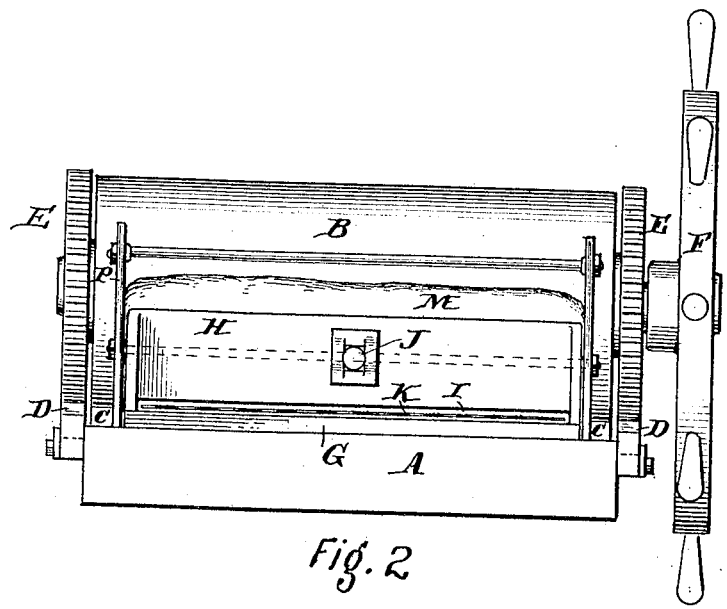

My invention will be better understood by reference to the drawings, in which:

Figure 1 is a longitudinal sectional elevation of a wire glass making machine adapted for carrying my improved process into operation and is taken on line 1—1 of Fig. 2; and Fig. 2 is an end elevation of the said machine.

A is the metal table or bed plate and is made smooth on its upper surface.

B is the smooth metal roller and runs upon guide strips or trangs C C resting upon the table A. The shaft of this roller is also provided with gears E which mesh with racks on the sides of the table for positively feeding the roller during its rotation. A hand wheel F may be employed to rotate the roller B and cause it to be fed forward under the control of the gears E and racks D. The trangs C regulate the space between the roller B and the table A and hence the thickness of the glass plate. P is a shoe or gun resting upon the table and moved forward by the roller B and consists of two side plates connected by rods. The function of the shoe or gun is to confine the body of glass against lateral spreading beyond the desired width.

Resting upon the surface of the table A is the flat guide plate G which extends laterally to the side plates of the shoe or gun P and may be guided thereby. This plate G is approximately of a thickness equal to the thickness of the glass to be rolled, but its thickness may be varied as desired. It is provided with an upright flange H which is slotted adjacent to the plate G at I for the full width to be occupied by the meshed wire layer K and through which slot said wire layer is fed as clearly indicated in the drawings. The guide G H for the meshed wire may be fed forward in any suitable manner, a hand rod J for this purpose being shown. While the guide G H may be moved forward at approximately the same speed as the travel of the roller, it is not desirable that it should move quite so rapidly because it is preferable that the molten glass M shall extend from the roller B forward to or very slightly if at all over the rear end of the plate G as shown. Under these conditions the glass will be allowed to flow through the meshes formed by the wire so as to fill the space L beyond the end of the plate G and beneath the wire and as the roller and guide plate G are moved forward. The meshed wire layer will float upon the glass which has thus passed below it and be covered by the rest of the mass until it is rolled forward, as will be readily understood by those familiar with the art. The thickness of the glass between the wire and table will be dependent upon the thickness of the trangs C C which regulate the actual thickness of the finished sheet of glass.

If the thickness of the plate G is excessive relatively to the thickness of the trangs C, the wire will tend to lie nearer the top surface of the finished glass, and vice versa. The upright or flange H acts as a guide through its slot to insure the meshed wire layer being held down to the surface of the plate G and also to locate its position laterally with respect to the gun or shoe.

The particular shape of the guide G H may be varied so long as it performs the functions herein set out namely, sustain the wire mesh at a definite distance above the table against the forward portion of the molten glass and guide the wire under said glass so as to temporarily hold it clear of the table and allow the glass to flow through its meshes. In the operation of the apparatus it is not necessary that the wire shall touch the table surface except perhaps at the beginning and ending of the operation of making the complete sheet of wire glass.

As this application is a division of my application Ser. No. 111,748 filed June 14th 1902, no claim is made to the method of making the wire glass herein set out as such method forms the subject matter of the aforesaid application.

I have shown an apparatus such as is excellently adapted for carrying into effect my improved method, but the details of the apparatus may be varied as may be found expedient for the more perfect operation of my invention.

Having now described my invention what I claim as new and desire to secure by Letters Patent, is:

1. In a wire glass machine, the table and flattening roller combined with a guide for the meshed wire sheet arranged in front of the flattening roller close to the table and adjustably supported so as to move at a less speed than the flattening roller, and a moving shoe or gun for confining the glass extending from the flattening roller to the guide for the meshed wire.

2. In a wire glass machine the combination of a table, a flattening roller, a gun having side walls resting upon the table and moved forward with the flattening roller, and a guide for the meshed wire sheet arranged close to the table and between the side walls of the gun and adjustable relatively to the gun and flattening roller whereby it may be moved forward at a less speed than the said gun and flattening roller.

3. In a wire glass machine the combination of a table, a flattening roller, a gun having side walls resting upon the table and moved forward with the flattening roller, and a guide for the meshed wire sheet arranged close to the table and between the side walls of the gun and adjustable relatively to the gun and flattening roller whereby it may be moved forward at a less speed than the said gun and flattening roller, the said guide consisting of a flat plate over which the wire sheet is fed and a slotted upper part for guiding the wire sheet and holding it down upon the plate portion.

4. In a wire glass machine, a table and roller for flattening the glass, combined with a guiding support for the meshed wire sheet movable with the roller, and means for adjusting the guiding support toward the roller during the rolling operation.

5. In a wire glass machine, a table and roller for flattening the glass, combined with a guiding support having a slotted portion for the meshed wire sheet movable with the roller, and means for forcing the guiding support toward the roller during the rolling operation.

In testimony of which invention, I hereunto set my hand.

FRANK SHUMAN.

Witnesses:
ALAN CRAIG CUNNINGHAM,
VICTOR SHUMAN.